(12) United States Patent
Kawaguchi

(10) Patent No.: US 8,104,128 B2
(45) Date of Patent: Jan. 31, 2012

(54) VEHICULAR SLOPE APPARATUS

(75) Inventor: Satoshi Kawaguchi, Takaoka (JP)

(73) Assignee: Aisin Keikinzoku Co., Ltd. (JP)

( * ) Notice: Subject to any disclaimer, the term of this patent is extended or adjusted under 35 U.S.C. 154(b) by 0 days.

(21) Appl. No.: 13/150,927

(22) Filed: Jun. 1, 2011

(65) Prior Publication Data

US 2011/0225745 A1 Sep. 22, 2011

Related U.S. Application Data

(63) Continuation of application No. PCT/JP2008/073036, filed on Dec. 18, 2008.

(51) Int. Cl.
*B65G 69/28* (2006.01)

(52) U.S. Cl. ............ 14/71.3; 296/61; 414/921; 119/849

(58) Field of Classification Search ................... 14/71.1, 14/71.3; 119/847, 849; 414/921; 296/61
See application file for complete search history.

(56) References Cited

U.S. PATENT DOCUMENTS

| | | | |
|---|---|---|---|
| 4,479,753 A * | 10/1984 | Thorley | 414/541 |
| 5,273,335 A * | 12/1993 | Belnap et al. | 296/61 |
| 6,293,748 B1 * | 9/2001 | Savaria | 414/537 |
| 6,802,095 B1 * | 10/2004 | Whitmarsh et al. | 14/71.3 |
| 6,834,903 B2 * | 12/2004 | Harper et al. | 296/51 |
| 7,549,692 B2 * | 6/2009 | Washington | 296/61 |

FOREIGN PATENT DOCUMENTS

| | | |
|---|---|---|
| JP | 2001-276133 | 10/2001 |
| JP | 2004-224086 | 8/2004 |
| JP | 2005-319886 | 11/2005 |
| JP | 2006-137320 | 6/2006 |

OTHER PUBLICATIONS

Microfilm of the Specification and Drawings annexed to the request of Japanese Utility Model Application No. 156233/1979 (Laid-open No. 71900/1981), The Nippon Aluminum Mfg., Co., Ltd., Jun. 13, 1981.

* cited by examiner

*Primary Examiner* — Gary S Hartmann
(74) *Attorney, Agent, or Firm* — Harness, Dickey & Pierce, P.L.C.

(57) ABSTRACT

A vehicular slope apparatus (1) includes a first slope section (10) that is rotatably connected to a body of a vehicle, and a second slope section (20) that is slidably connected to an extension side of the first slope section (10), the first slope section (10) including assistance mechanism (50) that applies an assistance force (Mf) in a direction in which the first slope section (10) rotates upwardly and, the assistance force (Mf) being larger than a downward moment that occurs at a center of gravity (M1) of the entire apparatus (1) when the entire apparatus (1) is horizontalized in a state in which the second slope section (20) is received within the first slope section (10), and is smaller than a downward moment that occurs at a center of gravity (M2) of the entire apparatus (1) when the second slope section (20) is extended from the first slope section (10) to a maximum extent, and the first slope section (10) rotating when the second slope section (20) has been extended to a predetermined extent so that an end of the slope apparatus comes in contact with the ground.

5 Claims, 3 Drawing Sheets

VEHICULAR SLOPE APPARATUS

CROSS REFERENCE TO RELATED APPLICATION

This application is a continuation of International Patent Application No. PCT/JP2008/73036, having an international filing date of Dec. 18, 2008, which designated the United States, the entirety of which is incorporated herein by reference.

BACKGROUND

The present invention relates to a vehicular slope apparatus that is housed in a vehicle, and extended away from the vehicle during use to form a slope between the floor of the vehicle and the ground. The invention is particularly effective for preventing a situation in which the slope apparatus is used in an insufficiently extended state.

A vehicular slope apparatus may include a plurality of slope sections that can be folded (folding slope apparatus) or slidingly moved (sliding slope apparatus) so that the slope apparatus can be housed inside the vehicle when the slope apparatus is not used.

The folding slope apparatus has an almost constant slope angle since the folding slope apparatus has a constant total length in an extended state. However, when the ground is not flat, and the height of the end of the slope apparatus from the ground changes to a large extent with respect to the height of the vehicle from the ground, the end of the slope apparatus may not come in contact with the ground, or the slope may be bent upward or downward to some extent.

The sliding slope apparatus can be used (i.e., a wheelchair can be loaded and unloaded) in a normal state in which the slope section is extended to a maximum extent (see FIG. 6A), and can also be used in a state in which the slope section is received within another slope section, and comes in contact with the ground (see FIG. 6B). In the latter case, however, it may be difficult to handle the wheelchair due to the steepness of the slope.

Specifically, since the slope angle θ(b) is larger than the slope angle θ(a) in a normally extended state, it may be difficult to load and unload the wheelchair.

In recent years, a slope apparatus that has a reduced height in an upright state from the viewpoint of rearward visibility, and also has a reduced slope angle in an extended state has been desired. This may make it necessary to further divide the sliding slope apparatus into a plurality of slope sections.

In this case, the difference between the slope angle θ(b) and the slope angle θ(a) further increases.

The inventor of the invention conducted extensive studies in order to prevent loading of a wheelchair when a sliding slope apparatus is not sufficiently extended.

A sliding slope apparatus is normally configured so that the base end of a first slope is rotatably connected to a vehicle, and a second slope section (and third slope section) is slidingly extended. Therefore, the inventor focused on the fact that the center of gravity of the slope section moves away from the vehicle when the second slope is extended.

JP-A-2006-137320 discloses a torsion bar that produces a biasing force in the housing direction in order to prevent rapid rotation when extending the slope apparatus and reduce the operation force required to house the slope apparatus in the vehicle.

However, the torsion bar disclosed in JP-A-2006-137320 merely assists rotation in the housing direction so that the front slope plate and the rear slope plate are housed to overlap.

JP-A-2004-224086 discloses technology that provides the tailgate with an assistance mechanism that assists a closing force applied to the tailgate and the slope member when folding and housing the slope member inside the vehicle.

However, the technology disclosed in JP-A-2004-224086 merely prevents rapid rotation of the tailgate, and reduces the manual operation force required when closing the tailgate. Specifically, the technology disclosed in JP-A-2004-224086 does not prevent a situation in which the slide slope is insufficiently extended.

SUMMARY

An object of the invention is to provide a safe sliding vehicular slope apparatus that makes it possible to easily detect an insufficiently extended state, and prevent a situation in which the slope apparatus is used in a steeply sloping state.

According to one aspect of the invention, there is provided a vehicular slope apparatus including a first slope section that is rotatably connected to a body of a vehicle at its base end, and a second slope section that is slidably connected to an extension side of the first slope section, the first slope section including an assistance mechanism that applies an assistance force (Mf) in a direction in which the first slope section rotates upwardly and toward the body around the base end as a rotation center, the assistance force (Mf) being larger than a downward moment that occurs at a center of gravity (M1) of the entire of the vehicular slope apparatus when the entire of the vehicular slope apparatus is horizontalized in a state in which the second slope section is received within the first slope section, and is smaller than a downward moment that occurs at a center of gravity (M2) of the entire of the vehicular slope apparatus when the second slope section is extended from the first slope section to a maximum extent, the center of gravity of the entire slope section continuously changing from the center of gravity M1 to the center of gravity M2 when the second slope section is slidingly extended from the first slope section, and the first slope section rotating when the second slope section has been extended to a predetermined extent so that an end of the vehicular slope apparatus comes in contact with the ground.

DESCRIPTION OF EXEMPLARY EMBODIMENTS

Figure 1:
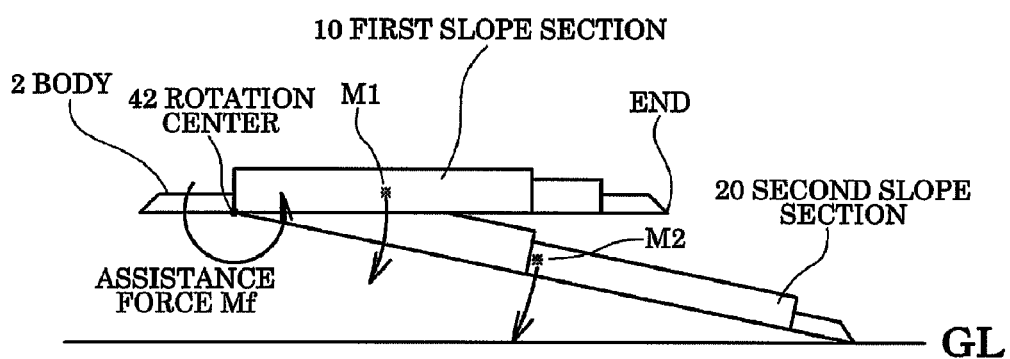
FIG. 1 illustrates an assistance force setting method according to the invention.

According to one embodiment of the invention, as shown in FIGS. 1 to 5, there is provided a vehicular slope apparatus 1 including a first slope section 10 that is rotatably connected to a body 2a of a vehicle 2 at its base end, and a second slope section 20 that is slidably connected to an extension side of the first slope section 10, the first slope section 10 including an assistance mechanism 50 that applies an assistance force (Mf) in a direction in which the first slope section 10 rotates upwardly and toward the body around the base end as a rotation center, the assistance force (Mf) being larger than a downward moment that occurs at a center of gravity (M1) of the entire of the vehicular slope apparatus 1 when the entire of the vehicular slope apparatus 1 is horizontalized in a state in which the second slope section 20 is received within the first slope section 10, and is smaller than a downward moment that occurs at a center of gravity (M2) of the entire of the vehicular slope apparatus 1 when the second slope section 20 is extended from the first slope section 10 to a maximum extent, the center of gravity of the entire slope section continuously changing from the center of gravity M1 to the center of gravity M2 when the second slope section 20 is slidingly extended from the first slope section 10, and the first slope section 10 rotating when the second slope section 20 has been extended to a predetermined extent so that an end of the vehicular slope apparatus 1 comes in contact with the ground.

The expression "the second slope section 20 is slidably connected to the extension side of the first slope section 10" means that the vehicular slope apparatus 1 is configured so that the second slope section 20 is slidingly extended from the first slope section 10 in the direction in which the vehicular slope apparatus 1 is extended from the vehicle 2. The embodiment also includes a vehicular slope apparatus 1 in which the second slope section 20 is divided into a plurality of slope sections, and each slope section is slidingly extended.

Since the assistance force (Mf) is larger than the downward moment that occurs at the center of gravity M1 when the entire of the vehicular slope apparatus 1 is horizontalized in a state in which the second slope section 20 is received within the first slope section 10, the end of the vehicular slope apparatus 1 does not come in contact with the ground GL when the vehicular slope apparatus 1 is rotated away from the vehicle 2 in a state in which the second slope section 20 is not extended (see FIG. 1 (schematic view)).

The center of gravity of the vehicular slope apparatus 1 moves away from the vehicle 2 when the second slope section 20 is extended from this state.

Since the assistance force is smaller than the downward moment that occurs at the center of gravity M2 when the second slope section 20 is extended from the first slope section 10 to a maximum extent (see FIG. 1), the end of the vehicular slope apparatus 1 comes in contact with the ground.

Since the embodiment utilizes the effect whereby the center of gravity of the entire of the vehicular slope apparatus 1 moves away from the vehicle 2 upon extension of the second slope section 20, the center of gravity of the entire of the vehicular slope apparatus 1 continuously changes from the center of gravity M1 to the center of gravity M2 when the second slope section 20 is slidingly extended from the first slope section 10.

The second slope section 20 is preferably extended from the first slope section 10 within a range of 350 to 1500 mm. In this case, it is preferable that the distance between the rotation center and the center of gravity M1 when the second slope section 20 is received within the first slope section 10 differ from the distance between the rotation center and the center of gravity M2 when the second slope section 20 is extended to a maximum extent by 100 mm or more.

The assistance mechanism 50 may be arbitrarily selected insofar as the above effects are obtained.

The assistance mechanism 50 may be a coil spring, a torsion spring, a combination of a damper structure and a tensile structure, or the like.

If the assistance mechanism 50 is integrally provided on the vehicular slope apparatus 1, the degree of freedom of the design of the vehicle 2 on which the vehicular slope apparatus 1 is mounted increases.

According to embodiment, if the second slope section 20 is insufficiently extended, the end of the vehicular slope apparatus 1 does not come in contact with the ground due to the assistance force in the direction in which the vehicular slope apparatus 1 rotates upwardly and toward the interior of the vehicle 2. Therefore, a situation in which the second slope section 20 is insufficiently extended can be easily observed with the naked eye, and a situation in which the vehicular slope apparatus 1 is used in a steeply sloping state can be prevented.

When the vehicular slope apparatus 1 has a rear gate connection type structure (i.e., the rear gate (tailgate) of the vehicle 2 is also extended when the vehicular slope apparatus 1 is extended), it is possible to prevent a situation in which design parts such as a bumper cover provided on the rear gate come in contact with the ground or the like (i.e., are damaged) due to the steepness of the slope.

Figure 2:
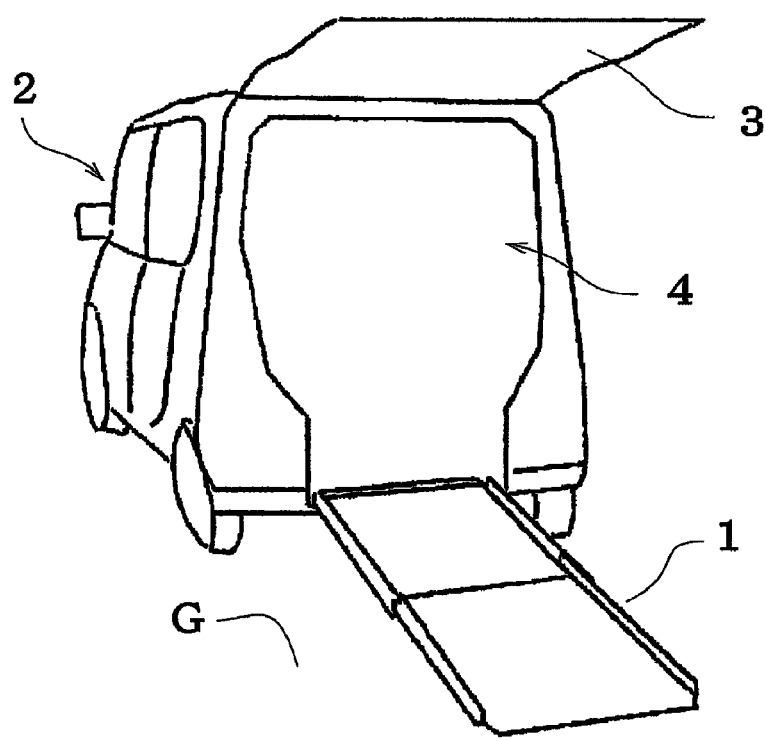
FIG. 2 is a perspective view illustrating a vehicle when a vehicular slope apparatus according to one embodiment of the invention is extended.
Figure 3:
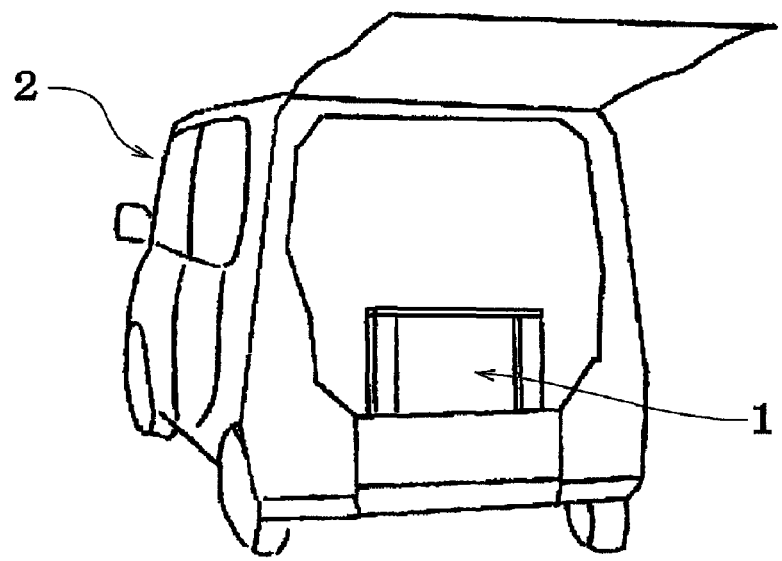
FIG. 3 is a perspective view illustrating a state in which a vehicular slope apparatus according to one embodiment of the invention is housed in a vehicle.

Exemplary embodiments of the invention are further described below with reference to the drawings. FIG. 2 is a perspective view illustrating a vehicle equipped with a vehicular slope apparatus 1. FIG. 2 illustrates a state in which a vehicular slope apparatus 1 is extended. A rear door 3 of a body 2 of the vehicle is opened, and a wheelchair (not shown) is loaded into an interior 4 of the vehicle.

The vehicular slope apparatus 1 is used to load and unload the wheelchair (not shown) into and from the rear floor inside the interior 4. The vehicular slope apparatus 1 is housed upright on the rear side of the interior 4 when the vehicular slope apparatus 1 is not used (see FIG. 3), and is extended during use so that the end of the vehicular slope apparatus 1 comes in contact with the ground, and the entire of the vehicular slope apparatus 1 slopes gently (see FIG. 2).

Figure 4:
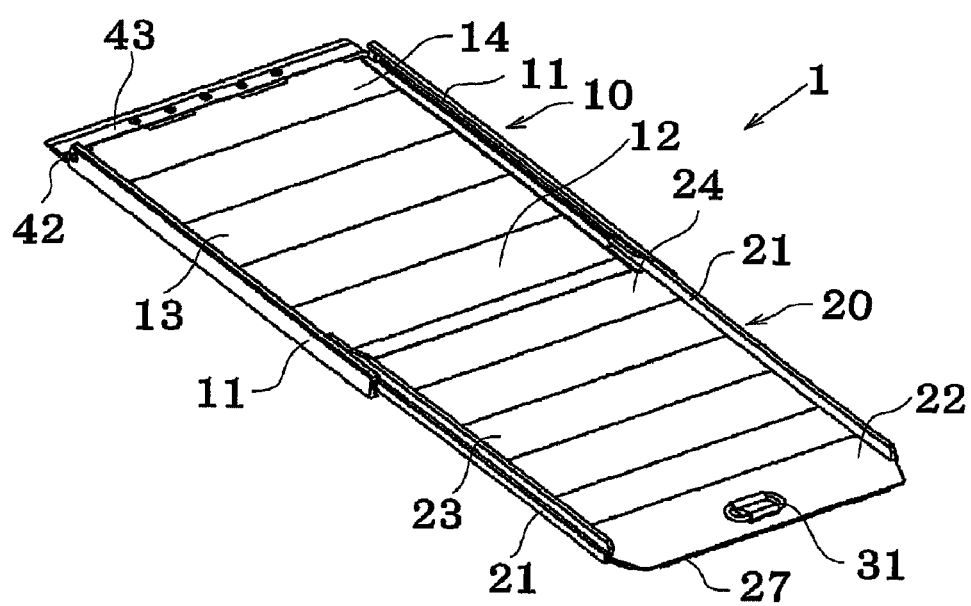
FIG. 4 is a perspective view illustrating a state in which a vehicular slope apparatus according to one embodiment of the invention is extended.

FIG. 4 is a view illustrating a vehicular slope apparatus according to one embodiment of the invention.

FIG. 4 illustrates a state in which a vehicular slope apparatus 1 is extended.

As illustrated in FIG. 4, the vehicular slope apparatus 1 includes a first slope section 10 that is positioned on the side of the body 2, and a second slope section 20 that is positioned on the side of the ground G, the first slope section 10 and the second slope section 20 are adjacent to each other when the vehicular slope apparatus 1 is extended.

The first slope section 10 includes a first rail member 11 that is provided on each end of the first slope section 10 in the widthwise direction and extends in the slide direction (i.e., the extension direction of the vehicular slope apparatus 1), a ground-side floor member 12, a plurality of intermediate floor members 13, and a vehicle-side floor member 14, the floor members 12, 13, and 14 extending in the widthwise direction of the first slope section 10.

The second slope section 20 includes a second rail member 21 that is provided on each end of the second slope section 20 in the widthwise direction and extends in the slide direction, a ground-side floor member 22, a plurality of intermediate floor members 23, and a vehicle-side floor member 24, the floor members 22, 23, and 24 extending in the widthwise direction of the second slope section 20.

When the second slope section 20 is received within the first slope section 10, the two second rail members 21 of the second slope section 20 are positioned inside the two first rail members 11 of the first slope section 10.

Each end of the floor members 12, 13, and 14 of the first slope section 10 and the floor members 22, 23, and 24 of the second slope section 20 in the widthwise direction is fitted into a groove that is formed (extends) in each of the first rail member 11 and the second rail member 21 in the longitudinal direction, and is secured by welding or using a screw.

A wheelchair or the like can be moved over the surface of the floor members (12 to 14 and 22 to 24). The first rail member 11 and the second rail member 21 prevent a situation in which the wheelchair comes off the vehicular slope apparatus 1.

Sliding members formed of a resin material are disposed between the first rail member 11 and the second rail member 21 so that the first rail member 11 and the second rail member 21 can slide relative to each other.

The sliding members are secured on the ground-side end of each first rail member 11 and the vehicle-side end of each second rail member 21 (i.e., four sliding members are provided in total).

The first rail member 11 and the second rail member 21 are formed in the shape of a groove or the like by extruding an aluminum alloy, for example.

A stopper section that protrudes inward is formed on the vehicle-side end of each first rail member 11 of the first slope section 10, and limits movement of the second slope section 20 relative to the first slope section 10 in the slide direction toward the body 2.

Specifically, the stopper section serves as a stopper mechanism that prevents an excessive slide of the second slope section 20 when the second slope section 20 is received within the first slope section 10.

The vehicle-side end of the vehicle-side floor member 24 of the second slope section 20 protrudes downward so that an engagement section is formed.

The engagement section of the floor member 24 engages an engagement section of the floor member 12, and limits movement of the second slope section 20 relative to the first slope section 10 in the slide direction toward the ground G.

Specifically, the engagement section serves as a stopper mechanism that prevents an excessive slide of the second slope section 20 when the second slope section 20 is extended.

The vehicle-side end of the vehicle-side floor member 24 of the second slope section 20 is sloped to form a slope portion, so that a difference in level is reduced when the wheelchair travels.

The ground-side end of the ground-side floor member 22 of the second slope section 20 is sloped to form a slope portion, and an end 27 of the floor member 22 comes in contact with the ground G when the second slope section 20 is extended (lowered).

A buffer member formed of a rubber material is secured on the back side of the floor member 22 so that the floor member 22 advantageously comes in contact with the ground G when the second slope section 20 is extended (lowered).

A protrusion is formed on the vehicle-side end face of the floor member 22, and a depression is formed in the ground-side end face of the floor member 23 adjacent to the floor member 22. The protrusion is fitted into the depression.

Likewise, a protrusion or a depression is formed on (in) the end face of each floor member (12 to 14 and 22 to 24) so that each protrusion is fitted into the opposite depression.

An antislip protrusion and depression (hollow) that extend in parallel to the longitudinal direction are integrally formed on (in) the side of each floor member (12 to 14 and 22 to 24) that forms the front surface of the vehicular slope apparatus 1 by extruding an aluminum alloy, for example.

As illustrated in FIG. 4, the vehicle-side floor member 14 of the first slope section 10 and a hinge 43 secured on the rear end of the floor inside the interior 4 are connected so as to be rotatable around a pin 42 (rotation center).

A fitting groove and a depression (hollow) are integrally formed in the hinge 43 by extruding an aluminum alloy, for example.

A handle 31 is provided on the ground-side floor member 22 of the second slope section 20 in the center area in the widthwise direction.

Figure 5:
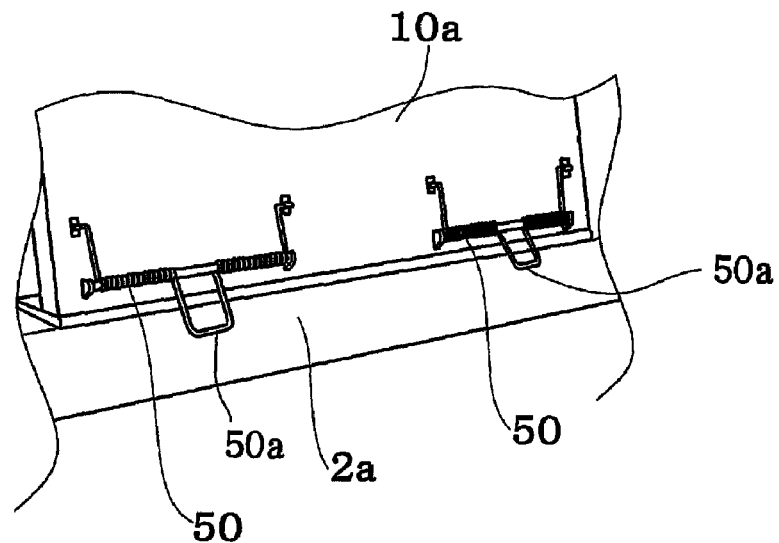
FIG. 5 illustrates an example of the structure of an assistance mechanism.
Figure 6A:
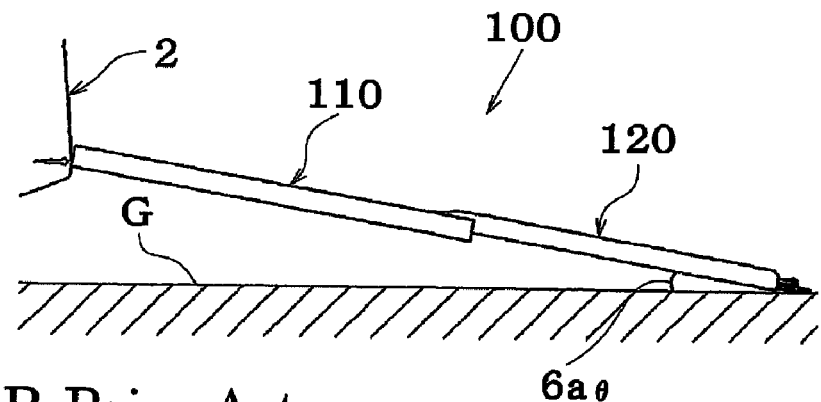
FIGS. 6A and 6B are a side view illustrating a related-art vehicular slope apparatus (FIG. 6A illustrates a state in which the vehicular slope apparatus is extended, and FIG. 6B illustrates a state in which the vehicular slope apparatus comes in contact with the ground in an unextended state).
Figure 6B:
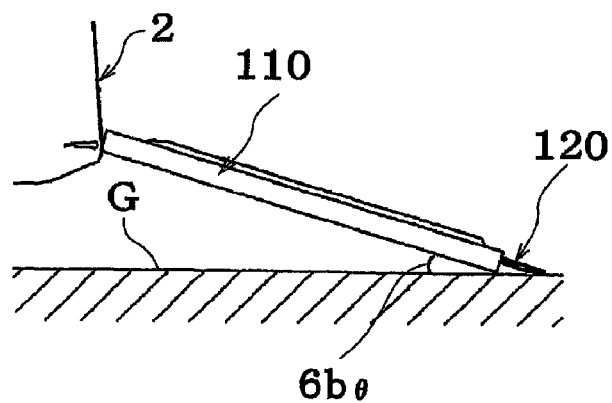

FIG. 5 illustrates an example of an assistance mechanism.

A coil spring 50 is disposed between a body 2a and a back surface 10a of the first slope section 10.

The coil spring 50 is secured on the vehicular slope apparatus 1. A first end of the coil spring 50 is contacted to the back surface 10a of the first slope section 10, and a second end 50a of the coil spring 50 is able to contact to the body 2a of the vehicle 2. An assistance force Mf occurs when one end 50a of the coil spring 50 is contacting to the body 2a.

The assistance mechanism may be implemented by a bias member that applies the assistance force (Mf), and the bias member can be formed by a torsion spring, a tensile mechanism, or the like instead of the coil spring.

In one embodiment of the invention, the distance between the pin 42 and the center of gravity M1 of the entire of the vehicular slope apparatus 1 is 430 mm when the second slope section 20 is received within the first slope section 10. The center of gravity M2 of the entire of the vehicular slope apparatus 1 continuously moves away from the vehicle when the second slope section 20 is extended, and the distance between the pin 42 and the center of gravity M2 is 780 mm when the second slope section 20 is extended to a maximum extent.

Therefore, when the weight of the entire of the vehicular slope apparatus 1 is 15 kg, the assistance force (Mf) is 64.5 N·m (=M1 (430 mm)×15 kg) or more and less than 117 N·m (=M2 (780 mm)×15 kg).

The assistance force is preferably set so that the end of the vehicular slope apparatus 1 comes in contact with the ground G when the second slope section 20 is extended to a predetermined extent, and need not necessarily be set based on the maximum extension of the second slope section.

An example in which one second slope section is provided has been described above. Note that the invention may also be applied to a slide structure that includes a plurality of second slope sections (i.e., the second slope section is divided into a plurality of slope sections).

The invention may be widely utilized in an industrial field of a slope apparatus that is mounted on and housed in a vehicle and is designed so that a plurality of slope sections are slidingly extended.

What is claimed is:

1. A vehicular slope apparatus comprising;
    a first slope section that is rotatably connected to a body of a vehicle at its base end, and
    a second slope section that is slidably connected to an extension side of the first slope section,
    the first slope section including an assistance mechanism that applies an assistance force (Mf) in a direction in which the first slope section rotates upwardly and toward the body around the base end as a rotation center,
    the assistance force (Mf) being larger than a downward moment that occurs at a center of gravity (M1) of the entire of the vehicular slope apparatus when the entire of the vehicular slope apparatus is horizontalized in a state in which the second slope section is received within the first slope section, and is smaller than a downward moment that occurs at a center of gravity (M2) of the entire of the vehicular slope apparatus when the second slope section is extended from the first slope section to a maximum extent, the center of gravity of the entire of the vehicular slope apparatus continuously changing from the center of gravity M1 to the center of gravity M2 when the second slope section is slidingly extended from the first slope section, and the first slope section rotating when the second slope section has been extended to a predetermined extent so that an end of the vehicular slope apparatus comes in contact with the ground.

2. The vehicular slope apparatus according to claim 1, the assistance mechanism being integrally provided on the vehicular slope apparatus.

3. The vehicular slope apparatus according to claim 1, the second slope section being extended from the first slope section within a range of 350 to 1500 mm.

4. The vehicular slope apparatus according to claim 1, a distance between the rotation center and the center of gravity (M2) being larger than a distance between the rotation center and the center of gravity (M1) by 100 mm or more.

5. The vehicular slope apparatus according to claim 2, the assistance mechanism including a bias member that applies the assistance force (Mf) to the first slope section, a first end of the bias member being contacted to the first slope section, a second end of the bias member being able to contact to the body of the vehicle, the assistance force (Mf) being occurred after the second end of the first slope section contacts to the body of the vehicle.

* * * * *